United States Patent
Lin

(10) Patent No.: US 10,921,665 B2
(45) Date of Patent: Feb. 16, 2021

(54) DISPLAY PANEL AND REPAIR METHOD FOR THE DISPLAY PANEL

(71) Applicant: HKC Corporation Limited, Guangdong (CN)

(72) Inventor: Peixin Lin, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/445,259

(22) Filed: Jun. 19, 2019

(65) Prior Publication Data

US 2020/0166813 A1 May 28, 2020

Related U.S. Application Data

(63) Continuation of application No. PCT/CN2018/123308, filed on Dec. 25, 2018.

(30) Foreign Application Priority Data

Nov. 27, 2018 (CN) .............................. 201811432230

(51) Int. Cl.
*G02F 1/1362* (2006.01)
*G02F 1/1339* (2006.01)
*G09G 3/36* (2006.01)

(52) U.S. Cl.
CPC ...... *G02F 1/136259* (2013.01); *G02F 1/1339* (2013.01); *G02F 1/136209* (2013.01);
(Continued)

(58) Field of Classification Search
CPC ......... G02F 1/136259; G02F 1/136286; G02F 1/1339; G02F 1/136209;
(Continued)

(56) References Cited

U.S. PATENT DOCUMENTS

2005/0195338 A1* 9/2005 Matsumoto ....... G02F 1/136259
349/40
2009/0021665 A1* 1/2009 Shiao ................ G02F 1/136259
349/54
(Continued)

FOREIGN PATENT DOCUMENTS

CN 1787217 A 6/2006
CN 201000518 Y 1/2008
(Continued)

OTHER PUBLICATIONS

English translation of JP-5099988-B2, Title: Liquid Crystal Display Apparatus, Author: Morita Shin, Fukami Tetsuo, Tanaka Yukio; Date of publication: Dec. 19, 2012 (Year: 2012).*

*Primary Examiner* — Shan Liu

(57) ABSTRACT

Disclosed are a display panel and a repair method for the display panel, the display panel includes an array substrate, a display area, a line arrangement area, a frame sealant surrounding the display area and located in the line arrangement area, a data line, a scan line, a signal line assembly including a first signal line group and a second signal line group, the first signal line group crossing the frame sealant and disposed on one end of the data line, the second signal line group disposed on the side of the frame sealant close to the display area, and a repair line group, disposed on the side of the frame sealant away from the display area, two ends of the repair line group being electrically connected to the first signal line group and the second signal line group respectively.

13 Claims, 7 Drawing Sheets

(52) U.S. Cl.
CPC ............... *G02F 1/136286* (2013.01); *G02F 2001/136222* (2013.01); *G02F 2001/136263* (2013.01); *G09G 3/3677* (2013.01); *G09G 3/3688* (2013.01)

(58) Field of Classification Search
CPC ........ G02F 2001/136263; G02F 2001/136222; G02F 1/1309; G02F 2001/136268; G02F 2001/136272; G09G 3/3688; G09G 3/3677
USPC ........................................................ 349/192
See application file for complete search history.

(56) References Cited

U.S. PATENT DOCUMENTS

| | | | |
|---|---|---|---|
| 2009/0033823 A1* | 2/2009 | Chung ................. | G09G 3/3648 349/54 |
| 2009/0167976 A1* | 7/2009 | Chung ............... | G02F 1/136259 349/54 |
| 2010/0265424 A1 | 10/2010 | Chiu et al. | |
| 2011/0146066 A1* | 6/2011 | Kim ...................... | G02F 1/1345 29/825 |
| 2012/0050658 A1* | 3/2012 | Cheng ............... | G02F 1/136259 349/139 |
| 2012/0169986 A1* | 7/2012 | Kwon ............... | G02F 1/136286 349/139 |
| 2014/0293211 A1* | 10/2014 | Terao .................... | G02F 1/1339 349/153 |
| 2015/0357355 A1 | 12/2015 | Itoh | |
| 2020/0004090 A1* | 1/2020 | Yoshida .............. | G06F 3/04164 |

FOREIGN PATENT DOCUMENTS

| | | | |
|---|---|---|---|
| CN | 101236975 A | | 8/2008 |
| CN | 101630073 A | | 1/2010 |
| CN | 101644838 A | | 2/2010 |
| CN | 101950110 A | | 1/2011 |
| CN | 102289119 A | | 12/2011 |
| CN | 102520534 A | | 6/2012 |
| CN | 102854679 A | | 1/2013 |
| CN | 103869513 A | | 6/2014 |
| JP | 5099988 B2 | * | 12/2012 |
| KR | 20080022716 A | | 3/2008 |

* cited by examiner

_US 10,921,665 B2_

DISPLAY PANEL AND REPAIR METHOD FOR THE DISPLAY PANEL

CROSS-REFERENCE TO RELATED DISCLOSURES

The present disclosure is a Continuation Application of International Disclosure with No. PCT/CN2018/123308, filed Dec. 25, 2018, which claims the benefit of China Patent Disclosure No. 201811432230.X, filed Nov. 27, 2018 with the State Intellectual Property Office and entitled "Display Panel and Repair Method for The Display Panel", the entirety of which is hereby incorporated herein by reference.

TECHNICAL FIELD

The present disclosure relates to the field of display technology, and more particularly relates to a display panel and a repair method for the display panel.

BACKGROUND

At present, during the manufacturing process of a liquid crystal display device with a narrow border, due to influences of the surface roughness, heat treatment, etching process, etc., the width of the data line in the array substrate structure is small, so the probability of the data line being disconnected is relatively high. When the data line is disconnected, signal cannot be transmitted to a corresponding pixel area, resulting in abnormal display of the liquid crystal display device.

When the disconnected data line is discovered before the box-forming process of the liquid crystal display device, the disconnected data line could be repaired by chemical vapor deposition. However, the detection of disconnected data line is prone to be missed in actual operation, thus a lot of disconnected data lines are discovered after the box aligning operation to the array substrate and color film substrate, causing waste and high costs. In the prior art, for some unfavorable problems, such as data line breakage, a repair line is provided around the panel in the early stage when the panel is designed. When repairing the display panel, the position of the repair line has a great influence on the high-resolution and the narrow border of the panel. The statements in this section merely provide background information related to the present disclosure and may not constitute prior art.

SUMMARY

It is one main objective of the present disclosure to provide a display panel, aiming to improve the high-resolution of the display panel, and provide the display panel with a narrow border.

In order to realize the above objective, a display panel provided by the present disclosure includes:

an array substrate, including a display area and a line arrangement area defined on an outer circumference of the display area;

a frame sealant, defined around the display area and located in the line arrangement area;

a data line, defined on the array substrate;

a scan line, defined crosswise with the data line and electrically connected to the data line;

a signal line assembly, defined on the array substrate, and located in the line arrangement area, the signal line assembly including a first signal line group and a second signal line group, the first signal line group crossing the frame sealant, and being defined adjacent to one end of the data line, the second signal line group being defined on a side of the frame sealant close to the display area, and adjacent to the end of the data line away from the first signal line group; and a repair line group, defined on the array substrate, and located in the line arrangement area, the repair line group being defined on a side of the frame sealant away from the display area, two ends of the repair line group being electrically connected to the first signal line group and the second signal line group respectively;

the two ends of the data line being electrically connected to the first signal line group and the second signal line group respectively, when the data line being disconnected.

In some embodiments, the repair line group includes two first repair lines defined at two opposite ends of the array substrate and a plurality of second repair lines defined at the bottom end of the array substrate, the plurality of second repair lines are spaced apart, the first repair line is electrically connected to one of the second repair lines, the end of the first repair line away from the second repair line is electrically connected to the first signal line group, two adjacent second repair lines are electrically connected via the second signal line group.

In some embodiments, the first signal line group includes a plurality of first signal line units spaced apart, each of the first signal line units includes two first signal lines and one second signal line, the two first signal lines are electrically connected, two ends of the second signal line are respectively insulated from one of the first signal lines, and two adjacent first signal line units are electrically connected via the first signal line, and the first signal line is electrically connected to the first repair line;

the data line is electrically connected to the second signal line, when the data line is disconnected.

In some embodiments, the second signal line group includes a plurality of second signal line units spaced apart, the number of the second signal line units is matched with the number of the first signal line units; each of the second signal line units includes each of third signal lines, two adjacent second signal line units are electrically connected via the third signal line, each of the third signal lines is electrically connected to the second repair line;

the data line is electrically connected to the third signal line, when the data line is disconnected.

In some embodiments, a cross-sectional area of the first repair line is larger than a cross-sectional area of the first signal line, and larger than a cross-sectional area of the second signal line, and larger than a cross-sectional area of the third signal line;

and/or, a cross-sectional area of the second repairing line is larger than a cross-sectional area of the first signal line, and larger than a cross-sectional area of the second signal line, and larger than a cross-section of the third signal line area.

In some embodiments, the data line includes a front end data line portion defined in the line arrangement area, a display area data line portion defined in the display area, and a rear end data line portion defined in the line arrangement area and away from the front end data line portion, the front end data line portion is adjacent to the first signal line group, the rear end data line portion is adjacent to the second signal line group, the display area data line portion is electrically connected to the scan line;

the front end data line portion is electrically connected to the first signal line group, and the rear end data line portion is electrically connected to the second signal line group, when the display area data line is disconnected.

In some embodiments, the display panel further includes:

a source driver, defined on the array substrate, and located in the line arrangement area, the source driver being defined on a side of the frame sealant away from the display area, the source driver being electrically connected to the first signal line group and the data line;

a gate driving circuit, defined on the array substrate, and located in the line arrangement area, the gate driving circuit being defined on a side of the frame sealant close to the display area, the scan line being electrically connected to the gate driving circuit.

In some embodiments, the display panel further includes:

a color filter substrate, the color film substrate being defined opposite to the array substrate;

a liquid crystal layer, the liquid crystal layer being defined between the array substrate and the color filter substrate, the frame sealant being defined between the array substrate and the color filter substrate, and defined around a periphery of the liquid crystal layer; and a sealing member, the sealing member being defined on a periphery of the array substrate and the color filter substrate, and defined around the repair line group.

In some embodiments, the display panel further includes a light shielding member defined on the color filter substrate, the light shielding member covers the line arrangement area.

In some embodiments, a display panel includes:

an array substrate, including a display area and a line arrangement area defined on an outer circumference of the display area;

a frame sealant, defined around the display area and located in the line arrangement area;

a data line, defined on the array substrate;

a scan line, defined crosswise with the data line and electrically connected to the data line;

a signal line assembly, defined on the array substrate, and located in the line arrangement area, the signal line assembly including a first signal line group and a second signal line group, the first signal line group crossing the frame sealant, and being defined adjacent to one end of the data line, the second signal line group being defined on a side of the frame sealant close to the display area, and adjacent to the end of the data line away from the first signal line group; and a repair line group, defined on the array substrate, and located in the line arrangement area, the repair line group being defined on a side of the frame sealant away from the display area, two ends of the repair line group being electrically connected to the first signal line group and the second signal line group respectively;

the two ends of the data line being electrically connected to the first signal line group and the second signal line group respectively, when the data line being disconnected;

a source driver, defined on the array substrate, and located in the line arrangement area, the source driver being defined on a side of the frame sealant away from the display area, the source driver being electrically connected to the first signal line group and the data line;

a gate driving circuit, defined on the array substrate, and located in the line arrangement area, the gate driving circuit being defined on a side of the frame sealant close to the display area, the scan line being electrically connected to the gate driving circuit;

a color filter substrate, the color film substrate being defined opposite to the array substrate;

a liquid crystal layer, the liquid crystal layer being defined between the array substrate and the color filter substrate, the frame sealant being defined between the array substrate and the color filter substrate, and defined around a periphery of the liquid crystal layer; and a sealing member, the sealing member being defined on a periphery of the array substrate and the color filter substrate, and defined around the repair line group.

The present disclosure further provides a repair method for a display panel, the repair method includes a display panel, the display panel includes:

an array substrate, including a display area and a line arrangement area defined on an outer circumference of the display area;

a frame sealant, defined around the display area and located in the line arrangement area;

a data line, defined on the array substrate;

a scan line, defined crosswise with the data line and electrically connected to the data line;

a signal line assembly, defined on the array substrate, and located in the line arrangement area, the signal line assembly including a first signal line group and a second signal line group, the first signal line group crossing the frame sealant, and being defined adjacent to one end of the data line, the second signal line group being defined on a side of the frame sealant close to the display area, and adjacent to the end of the data line away from the first signal line group; and a repair line group, defined on the array substrate, and located in the line arrangement area, the repair line group being defined on a side of the frame sealant away from the display area, two ends of the repair line group being electrically connected to the first signal line group and the second signal line group respectively;

the two ends of the data line being electrically connected to the first signal line group and the second signal line group respectively, when the data line being disconnected.

when the data line located in the display area is disconnected, the repair method includes the following operations:

allowing one end of the disconnected data line to be electrically connected to the first signal line group, and the other end of the disconnected data line to be electrically connected to the second signal line group, to realize the data line located in the display area being electrically connected to the scan line.

In the present disclosure, the display panel includes an array substrate, a frame sealant, a data line, a scan line, a signal line assembly and a repair group. The repair line group is disposed on the array substrate, and located in the line arrangement area. The repair line group is disposed on the side of the frame sealant away from the display area, two ends of the repair line group are electrically connected to the first signal line group and the second signal line group respectively, so that the load of the repair line group is reduced. Under the requirement for high-resolution product, there would be no shortage of charging rate, meeting the requirement for the high-resolution. And by disposing the repair line group on the side of the frame sealant away from the display area, the line width of the repair line group is half the line width according to the prior art, so that a narrow border compared to prior art is realized.

BRIEF DESCRIPTION OF THE DRAWINGS

In order to illustrate the technical solution in the embodiments of the present disclosure or the prior art more clearly, brief description would be made below to the drawings required in the embodiments of the present disclosure or the prior art. Obviously, the drawings in the following description are merely some of the embodiments of the present disclosure, and those skilled in the art could obtain other drawings according to the structures shown in the drawings without any creative efforts.

REFERENCE SIGNS DESCRIPTION

Figure 1:
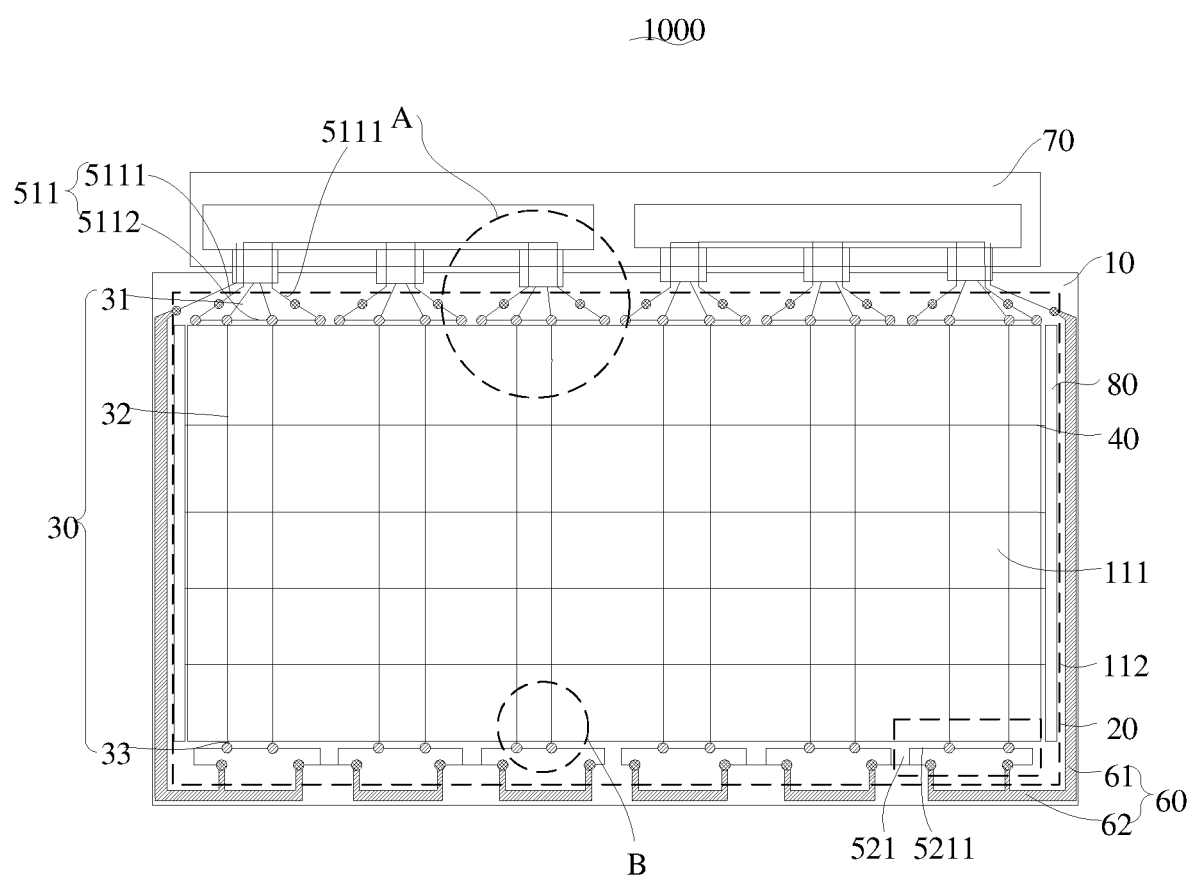
FIG. 1 is a structure diagram shows the display panel when the data line is not disconnected according to the present disclosure.

| sign | name |
| --- | --- |
| 1000 | display panel |
| 10 | array substrate |
| 111 | display area |
| 112 | line arrangement area |
| 20 | frame sealant |
| 30 | data line |
| 31 | front end data line portion |
| 32 | display area data line portion |
| 33 | rear end data line portion |
| 40 | scan line |
| 511 | first signal line unit |
| 5111 | first signal line |
| 5112 | second signal line |
| 521 | second signal line unit |
| 5211 | third signal line |
| 60 | repair line group |
| 61 | first repair line |
| 62 | second repair line |
| 70 | source driver |
| 80 | gate driving circuit |
| 90 | color filter substrate |
| 100 | liquid crystal layer |
| 110 | sealing member |
| 120 | light shielding member |

The realizing of the aim, functional characteristics and advantages of the present disclosure are further described in detail with reference to the accompanying drawings and the embodiments.

DETAILED DESCRIPTION OF THE EMBODIMENTS

The technical solutions in the embodiments of the present disclosure will be described clearly and completely combining the drawings in the embodiments of the present disclosure. Obviously, the described embodiments are only a part of the embodiments of the present disclosure, but not all of them. Based on the embodiments in the present disclosure, all other embodiments obtained by those skilled in the art without creative work shall belong to the protection scope of the present disclosure.

It should be understand that, all directional indications (such as "upper", "lower", "left", "right", "front", "back" . . . ) in the embodiments of the present disclosure are only used to explain the relative positional relationship, motion, and the like, between components in a certain posture. If the particular posture changes, the directional indication changes accordingly.

In the present disclosure, unless specified or limited otherwise, the terms "connected", "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which could be understood by those skilled in the art according to specific situations.

Moreover, terms such as "first" and "second" are used herein for purposes of description and are not intended to indicate or imply relative importance or to imply the number of indicated technical features. Thus, the features defined with "first" and "second" may comprise or imply at least one of these features. In addition, the technical solutions between the various embodiments of the present disclosure may be combined with each other, but must be based on the realization of those skilled in the art. When the combination of technical solutions is contradictory or impossible to implement, it should be considered that the combination of the technical solutions does not exist, and not within the scope of protection required by this disclosure.

The present disclosure provides a display panel 1000.

Referring to FIGS. 1 to 6, in the embodiment of the present disclosure, the display panel 1000 includes:

an array substrate 10, including a display area 111 and a line arrangement area 112 disposed on the outer circumference of the display area 111;

a frame sealant 20, disposed around the display area 111 and located in the line arrangement area 112;

a data line 30, disposed on the array substrate 110;

a scan line 40, disposed crosswise with the data line 30 and electrically connected to the data line 30;

a signal line assembly, disposed on the array substrate 10, and located in the line arrangement area 112, the signal line assembly including a first signal line group and a second signal line group, the first signal line group crossing the frame sealant 20, and being disposed adjacent to one end of the data line 30, the second signal line group being disposed on the side of the frame sealant 20 close to the display area 111, and adjacent to the end of the data line 30 away from the first signal line group; and a repair line group 60, disposed on the array substrate 10, and located in the line arrangement area 112, the repair line group 60 be disposed on the side of the frame sealant 20 away from the display area 111, and two ends of the repair line group 60 being electrically connected to the first signal line group and the second signal line group respectively;

the two ends of the data line 30 being electrically connected to the first signal line group and the second signal line group respectively, when the data line 30 being disconnected.

Specifically, the array substrate 10 is a transparent substrate, such as a glass substrate, a quartz substrate, or the like. The array substrate 10 includes a display area 111 and a line arrangement area 112 disposed on the outer periphery of the display area 111. The display area 111 is located in the middle of the array substrate 10, and the line arrangement area 112 is located on the outer periphery of the display area 111. The array substrate optionally has a square structure, the display area 111 is a square display area. The frame sealant 20 is disposed around the display area 111 and located in the line arrangement area 112. The data line 30 is disposed on the array substrate 10, the scan line 40 vertically intersects with the data line 30 and is electrically connected to the data line 30 located in the display area 111.

The signal line assembly is disposed on the array substrate 10, and located in the line arrangement area 112. The signal line assembly includes a first signal line group and a second signal line group. The first signal line group passes through the frame sealant 20, and is adjacent to one end of the data line 30. The second signal line group is disposed on the side of the frame sealant 20 close to the display area 111, and adjacent to the end of the data line 30 away from the first signal line group. When the data line 30 is not disconnected, one end of the data line 30 is insulated from the first signal line group, and the other end is insulated from the second signal line group. It should be understood that, the overlapping portion between one end of the data line 30 and the first signal line group is provided with an insulating layer for electrical insulation, and the overlapping portion between the other end of the data line 30 and the second signal line group is provided with an insulating layer for electrical insulation. When the data line 30 is disconnected, two ends of the data line 30 are electrically connected to the first signal line group and the second signal line group, respectively. The insulated connections, between the data line 30 and the first signal line group, and between the data line 30 and the second signal line group, are melted by laser, so that the two ends of the data line 30 are electrically connected to the first signal line group and the second signal line group respectively.

The repair line group 60 is disposed on the array substrate 10, and located in the line arrangement area 112. The repair line group 60 is disposed on the side of the frame sealant 20 away from the display area 111. Two ends of the repair line group 60 are electrically connected to the first signal line group and the two signal line group respectively. The repair line group 60 and the signal line assembly are located in a same surface of the array substrate 10. To facilitate the electrical wiring, and fully utilize the space of the line arrangement area 112, the signal line assembly and the repair line group 60 are respectively disposed on different sides of the display area 111.

In the prior art, when the repair line group 60 is disposed on the side of the frame sealant 20 close to the display area 111, since a liquid crystal layer is disposed inside the frame sealant 20, according to the parallel capacitance formula, the load of the repair line group 60 is obtained:

$$L1 = \frac{\varepsilon_0 \varepsilon_r A}{d},$$

$\varepsilon_0$ is the dielectric constant in vacuum, $\varepsilon_r$ is the dielectric constant of the liquid crystal material. In the present disclosure, there is no liquid crystal on the repair line group 60, therefore, the load of the repair line group 60 is $$L2 = \frac{\varepsilon_0 A}{d}.$$

The load according to the present disclosure is smaller. As such, the load of the repair line group 60 according to the present disclosure is reduced, for the high-resolution product, there would be no problem of insufficient charging rate, so the present disclosure could meet the demand of high resolution.

In addition, if the repair line group 60 and the frame sealant 20 are stacked, since the repair line group 60 is disposed on the lower surface of the frame sealant 20, a groove for electrical wiring is provided on the repair line group 60, so that the width of the repair line group 60 is much larger than the present design.

In the present disclosure, the display panel 1000 includes an array substrate 10, a frame sealant 20, a data line 30, a scan line 40, a signal line assembly, and a repair line group 60. The repair line group 60 is disposed on the array substrate 10 and located in the line arrangement area 112. The repair line group 60 is disposed on the side of the frame sealant 20 away from the display area 111, two ends of the repair line group 60 are electrically connected to the first signal line group and the second signal line group respectively, so that the load of the repair line group 60 is reduced. Under the requirement of the high-resolution product, there would be no problem of insufficient charging rate, meeting the demand of high resolution. And the repair line group 60 is disposed on the side of the sealant 20 away from the display area 111, the line width of the repair line group 60 is half the conventional line width, which enables a narrow border compared to conventional designs.

Referring to FIGS. 1 to 6, the repair line group 60 includes two first repair lines 61 disposed at two opposite ends of the array substrate 10, and a plurality of second repair lines 62 disposed at the bottom end of the array substrate 10. The plurality of second repair lines 62 are spaced apart. The first repair line 61 is electrically connected to the second repair line 62. The end of the first repair line 61 away from the second repair line 62 is electrically connected to the first signal line group. Two adjacent second repair lines 62 are electrically connected via the second signal line group.

In this embodiment, the repair line group 60 includes two first repair lines 61 and a plurality of second repair lines 62. The two first repair lines 61 are disposed on two opposite ends of the array substrate 10, and could respectively repair one data line 30. Of course, in other embodiments, three or four or more first repair lines 61 may be provided, which accordingly repair the corresponding number of data lines 30, which are not specifically limited herein.

The end of the first repair line 61 away from the second repair line 62 is electrically connected to the first signal line group, two adjacent second repair lines 62 are electrically connected via the second signal line group, so that when the data line 30 is disconnected, signal transmission could be realized.

Referring to FIGS. 1 to 6, the first signal line group includes a plurality of first signal line units 511 spaced apart. Each of the first signal line units 511 includes two first signal lines 5111 and one second signal line 5112. The two first signal lines 5111 are electrically connected, two ends of the second signal line 5112 are respectively insulated from one of the first signal lines 5111. Two adjacent first signal line units 511 are electrically connected via the first signal line 5111, and the first signal line 5111 is electrically connected to the first repair line 61.

When the data line 30 is disconnected, the data line 30 is electrically connected to the second signal line 5112.

Figure 2:
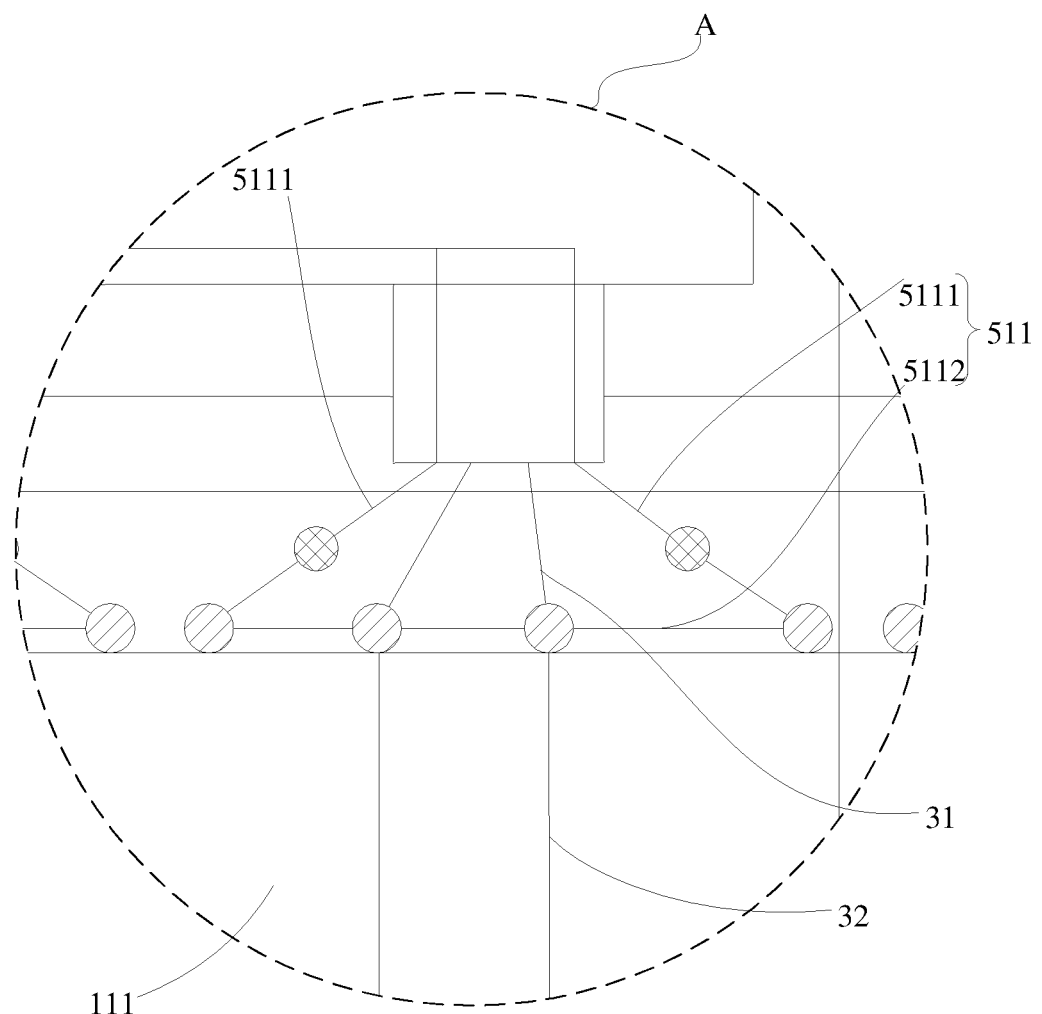
FIG. 2 is a partial enlargement diagram of A as shown in FIG. 1.

In this embodiment, the first signal line group includes a plurality of first signal line units 511, the first signal line unit 511 includes two first signal lines 5111 and a second signal line 5112. The two first signal lines 5111 are electrically connected, two ends of the second signal line 5112 are respectively insulated from one of the first signal lines 5111. It should be understood that, portions where two ends of the second signal line 5112 overlap with the first signal lines 5111 are electrically insulated by insulating layers. When the data line 30 is disconnected, the data line 30 is electrically connected to the second signal line 5112, that is, by laser melting the insulated connection of the data line 30 and the second signal line 5112, so that the data line 30 and the second signal line 5112 are electrically connected. And in order to minimize the capacitance resistance, and not share the signal of the data line 30 to other lines, to maintain the optimal data line voltage, all the data line voltages are directly applied to the disconnected data line 30, the second signal line 5112 on the left side of the melted point is cut by laser, referring to the black rectangular frame in FIG. 5. The laser energy used for laser melting is 0.5 J to 1 J. The laser energy used for laser cutting is 1 J to 5 J. In FIG. 2, the overlapping portion of the second signal line 5112 and the data line 30 is insulated, and in FIG. 5, the overlapping portion of the second signal line 5112 and the data line 30 after laser melting, is electrically connected.

Referring to FIGS. 1 to 6, the second signal line group includes a plurality of second signal line units 521 spaced apart. The number of the second signal line units 521 matches the number of the first signal line units 511. Each of the second signal line units 521 includes a third signal line 5211. Two adjacent second signal line units 521 are electrically connected via the third signal line 5211. Each of the third signal lines 5211 is electrically connected to the second repair line 62.

When the data line 30 is disconnected, the data line 30 is electrically connected to the third signal line 5211.

Figure 3:
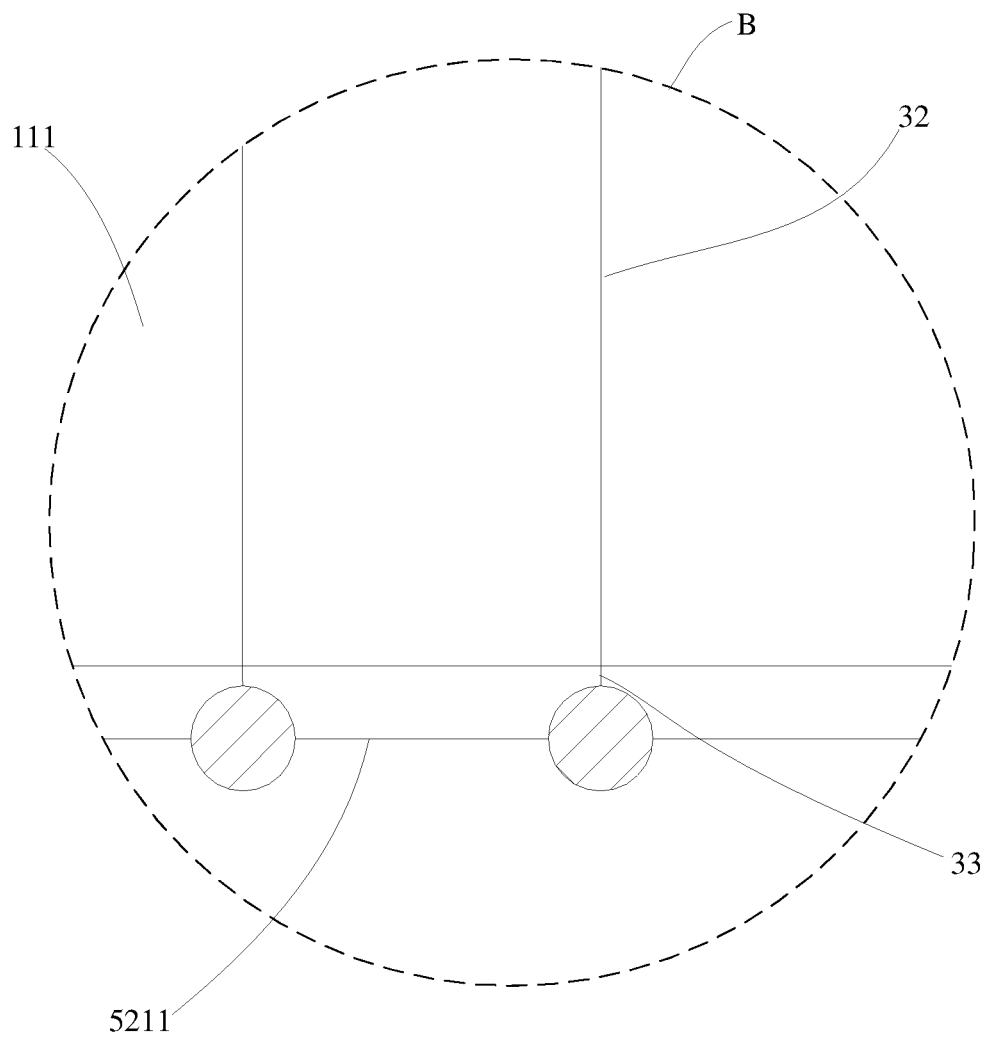
FIG. 3 is a partial enlargement diagram of B as shown in FIG. 1.
Figure 4:
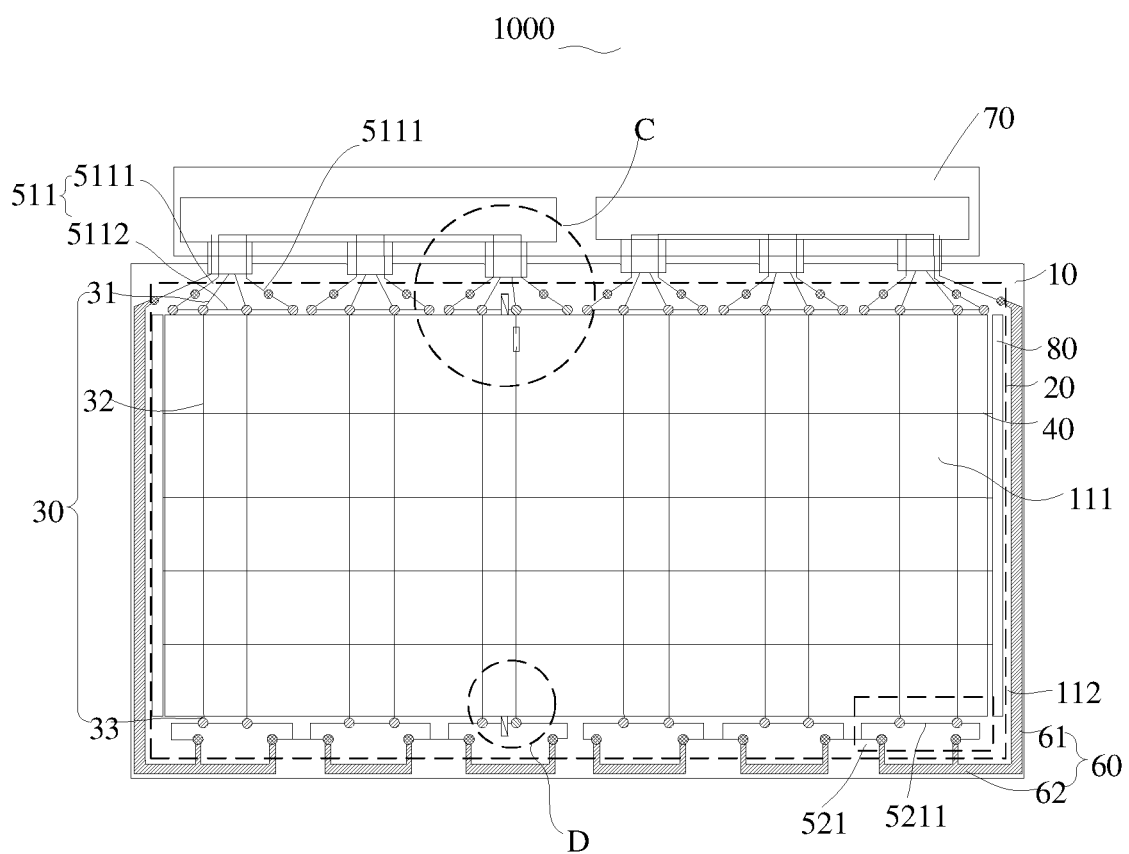
FIG. 4 is a structure diagram shows the display panel when the data line is disconnected according to the present disclosure.
Figure 5:
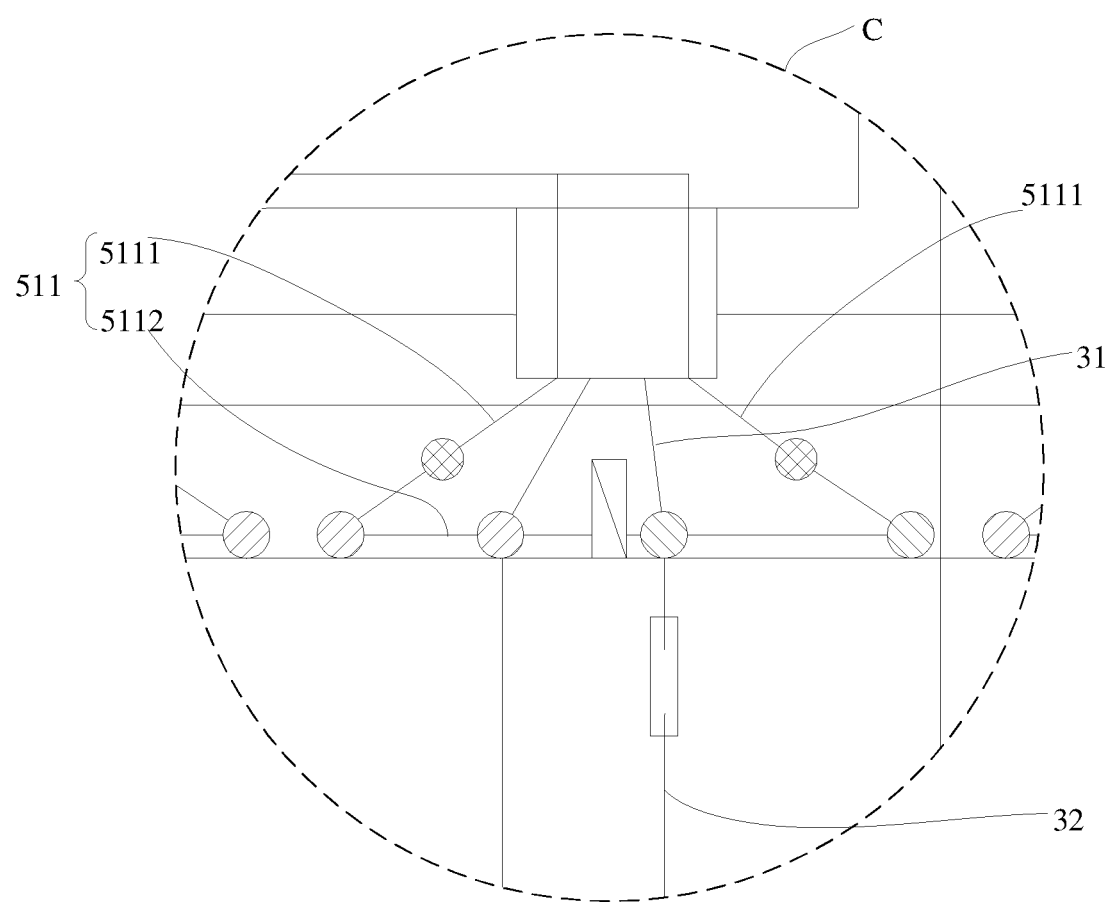
FIG. 5 is a partial enlargement diagram of C as shown in FIG. 4.
Figure 6:
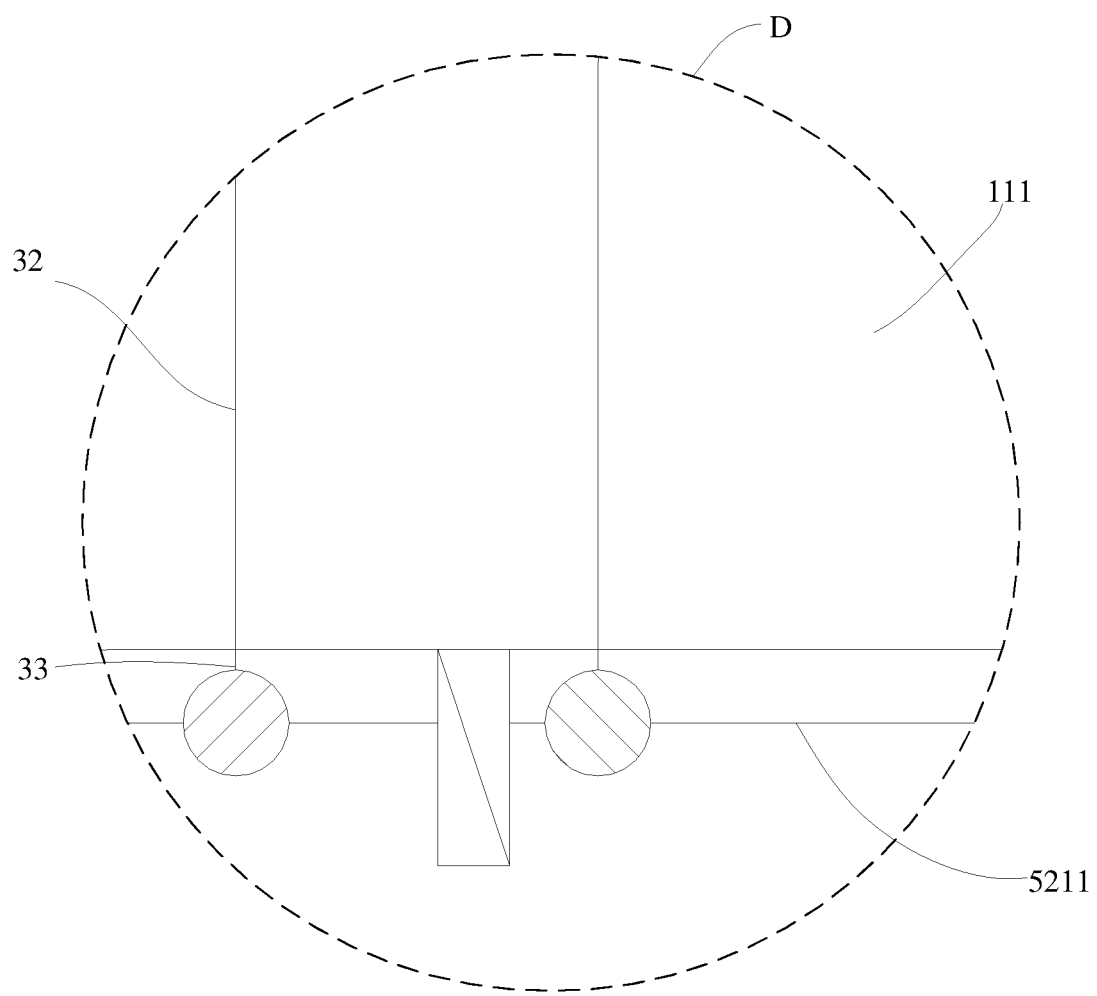
FIG. 6 is a partial enlargement diagram of D as shown in FIG. 4.

In this embodiment, the second signal line group includes a plurality of second signal line units 521, the second signal line unit 521 includes a third signal line 5211, two adjacent two second signal line units 521 are electrically connected via the third signal line 5211. Each of the third signal lines 5211 is electrically connected to the second repair line 62. When the data line 30 is not disconnected, the overlapping portion of the data line 30 and the third signal line 5211 is insulated, that is, by laser melting the insulated connection of the data line 30 and the third signal line 5211, so that the data line 30 and the third signal line 5211 are electrically connected. Similarly, in order to minimize the capacitance resistance, the third signal line 5211 on the left side of the melted point is cut by laser, referring to the black rectangular frame in FIG. 6. In FIG. 3, the overlapping portion of the third signal line 5211 and the data line 30 is insulated, and in FIG. 6, the overlapping portion of the third signal line 5211 and the data line 30 after laser melting, is electrically connected.

Referring to FIGS. 1 to 4, the cross-sectional area of the first repair line 61 is, larger than the cross-sectional area of the first signal line 5111, larger than the cross-sectional area of the second signal line 5112, and larger than the third signal line 5211.

And/or, the cross-sectional area of the second repair line 62 is, larger than the cross-sectional area of the first signal line 5111, larger than the cross-sectional area of the second signal line 5112, and larger than the third signal line 5211.

In this embodiment, the reaction time and the delay rate of the display panel 1000 T=RC, R is the impedance magnitude, C is the capacitance magnitude, and R is related to the thickness and length in the repair line group 60 and the signal line assembly, C is related to the overlapping area of the data line 30 and the repair line group 60 and the signal line assembly. Since the first signal line 5111 is provided in plurality, the second signal line 5112 is provided in plurality, the third signal line 5211 is provided in plurality, and the second repair line 60 is provided in plurality. The cross-sectional area of the first repairing line 61 is larger than the cross-sectional area of the first signal line 5111, larger than the cross-sectional area of the second signal line 5112, and larger than the cross-sectional area of the third signal line 5211; the cross-sectional area of the second repair line 62 is larger than the cross-sectional area of the first signal line 5111, larger than the cross-sectional area of the second signal line 5112, and larger than the cross-sectional area of the third signal line 5211, such that the area of the data line 30 overlapping the signal line 5112 and the third signal line 5211 is relatively smaller the area of the data line 30 directly overlapping the first repair line 61 and the second repair line 62, therefore, the capacitance C is small. In the figure, the third signal line 5211 is thin and short, the first repair line 61 and the second repair line 62 are thick and long, the impedance R is small, so the reaction time of the display panel 1000 is short, and the delay rate is low.

Referring to FIGS. 1 to 4, the data line 30 includes a front end data line portion 31 located in the line arrangement area 112, a display area data line portion 32 located in the display area 111, and a rear end data line portion 33 located in line arrangement area 112 and located away from the front end data line portion 31. The front end data line portion 31 is adjacent to the first signal line group, the rear end data line portion 33 is adjacent to the second signal line group, the display area data line portion 32 is electrically connected to the scan line 40.

When the data line 30 is disconnected, the front end data line portion 31 is electrically connected to the first signal line group, and the rear end data line portion 33 is electrically connected to the second signal line group.

In this embodiment, when the data line 30 is not disconnected, the front end data line portion 31 and the first signal line group are in an insulted connection, that is, the overlapping portion of the front end data line portion 31 and the first signal line group is insulated, that is, the overlapping portion is electrically insulated by an insulating layer. The rear end data line portion 33 is insulated from the second signal line group, that is, the overlapping portion of the rear end data line portion 33 and the second signal line group is insulated, that is, the overlapping portion where the two overlap with each other is electrically insulated by an insulating layer.

When the display area data line 32 is disconnected, the front end data line portion 31 is electrically connected to the first signal line group, and the rear end data line portion 33 is electrically connected to the second signal line group, that is, by laser melting the insulated connection of the front end data line portion 31 and the first signal line group, the front data line portion 31 is electrically connected to the first signal line group. By laser melting the insulated connection of the rear end data line portion 33 and the second signal line group, the rear data line portion 33 is electrically connected to the second signal line group.

Referring to FIGS. 1 to 4, the display panel 1000 further includes:

a source driver 70, disposed on the array substrate 10, and located in the line arrangement area 112, the source driver 70 being disposed on the side of the frame sealant 20 away from the display area 111, the source driver 70 being electrically connected to the first signal line group and the data line 30;

a gate driving circuit 80, disposed on the array substrate 10, and located in the line arrangement area 112, the gate driving circuit 80 being disposed on the side of the frame sealant 20 close to the display area 111, the scan line 40 being electrically connected to the gate driving circuit 80.

In this embodiment, the display panel 1000 is a GOA panel, namely, a gate driving circuit panel. The gate driving circuit 80 is disposed on the array substrate 10, and is located in the line arrangement area 112. The gate driving circuit 80 is disposed on the side of the frame glue 20 close to the display area 111. The scan line 40 is connected to the gate driving circuit 80.

Figure 7:
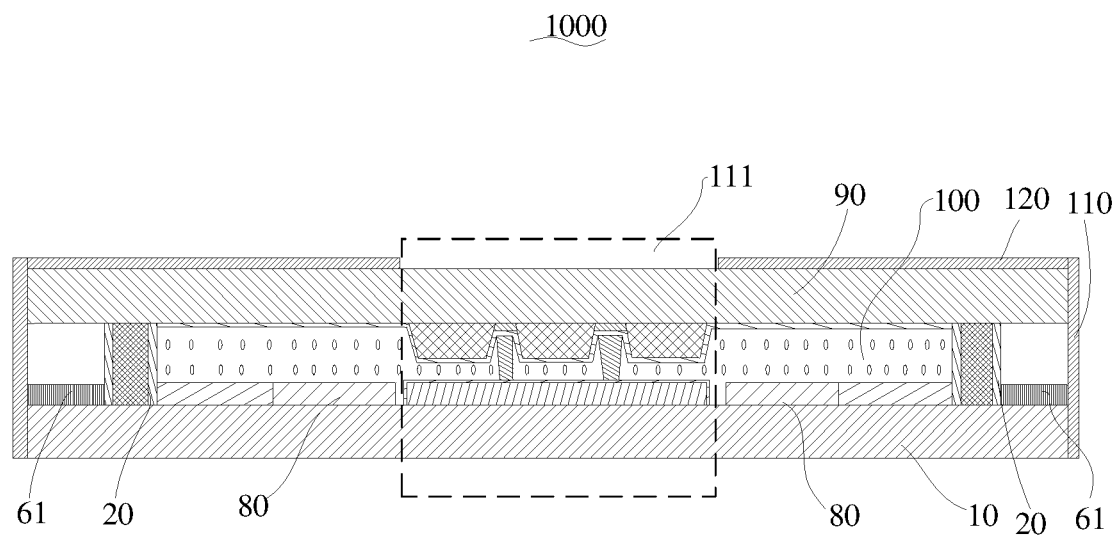
FIG. 7 is a cross sectional diagram of the display panel of an embodiment according to the present disclosure.
Figure 8:
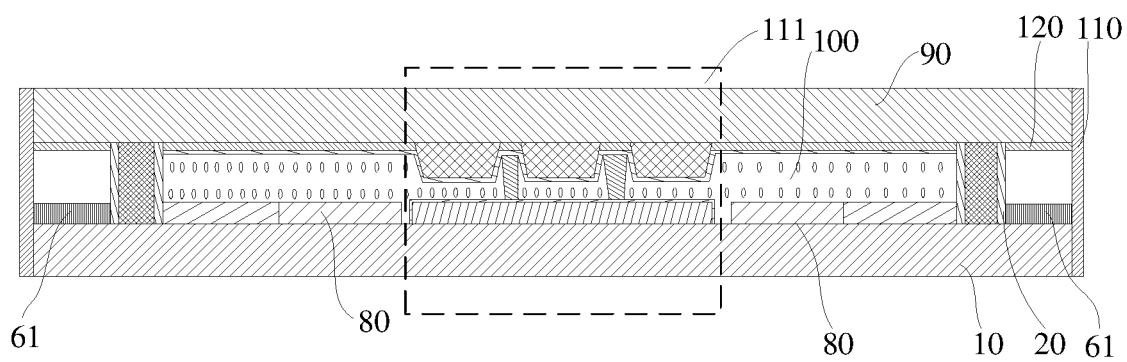
FIG. 8 is a cross sectional diagram of the display panel of another embodiment according to the present disclosure.

Referring to FIGS. 7 and 8, the display panel 1000 further includes:

a color filter substrate 90, the color film substrate 90 being disposed opposite to the array substrate 10;

a liquid crystal layer 100, the liquid crystal layer 100 being disposed between the array substrate 10 and the color filter substrate 90, the frame sealant 20 being disposed between the array substrate 10 and the color filter substrate 90, and defined around the periphery of the liquid crystal layer 100; and a sealing member 110, the sealing member 110 being disposed on the periphery of the array substrate 10 and the color filter substrate 90, and disposed around the repair line group 60.

In this embodiment, the frame sealant 20 is filled with a conductive crystal ball, to allow the common electrode lines (not shown) on the color filter substrate 90 and the array substrate 10 to be conductive. The frame sealant 20 is disposed between the array substrate 10 and the color filter substrate 90, and around the periphery of the liquid crystal layer 100, so as to prevent the liquid crystal layer 100 from leaking out.

The sealing member 110 is disposed on the periphery of the array substrate 10 and the color filter substrate 90, and is disposed around the repair line group 60. The sealing member 110 functions to prevent moisture from entering the repair line group 60, to corrode the repair line group 60. The material made of the sealing member 60 may be black glue or N-type oxide semiconductor-indium tin oxide (ITO) anti-corrosion glue.

In some embodiments, referring to FIGS. 7 to 8, the display panel 1000 further includes a light shielding member 120 disposed on the color filter substrate 90. The light shielding member 120 covers the line arrangement area 112.

In this embodiment, since the display panel 1000 is with a narrow border, a plurality of metal wires are disposed on the edge thereof. In order to shield the light of the edge of the display panel 1000, the user does not see it by the naked eye, so as to realize the overall aesthetic appearance, the light shielding member 120 is made of an opaque material. The light shielding member 120 is disposed on the color filter substrate 90. The light shielding member 120 may be the black glue disposed on the side of the color filter substrate 90 away from the array substrate 10, or may be a black matrix disposed on the side of the color filter substrate 90 close to the array substrate 10, which is not limited herein.

The present disclosure further provides a repair method for a display panel. The repair method for the display panel includes a display panel 1000, the specific structure of the display panel 1000 refers to the above embodiments. Since the repair method for the display panel adopts all the technical solutions of the above embodiments, therefore, the repair method for the display panel has at least all the effects brought about by the technical solutions of the above embodiments, which is not be further described herein.

A repair method for a display panel, including a display panel, when the data line 30 located in the display area is disconnected, the following steps are included:

allowing one end of the disconnected data line to be electrically connected to the first signal line group, and the other end of the disconnected data line to be electrically connected to the second signal line group, to realize the data line located in the display area being electrically connected to the scan line.

In this embodiment, after the display panel 1000 is detected, if the display panel 1000 could normally display, since the data line 30 is electrically insulated from the first signal line group and the second signal line group, signals between multiple signal lines 30 in the display panel 1000 do not interfere with each other. The signals between 30 do not interfere with each other. After detecting an abnormal display area, one end of the data line 30 is electrically connected to the first signal line group, and the other end of the data line 30 is electrically connected to the second signal line group. The conduction manner is the laser melting, and the laser energy used for melting is 0.5 J to 1 J. The signal of the data line 30 is synchronously transmitted to the disconnection, where the display is abnormal, by the wiring of the repair line group 60 and the electrically connecting of the first signal line group and the second signal line group.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect disclosures thereof in other related technical fields shall all fall in the scope of protection of the disclosure.

What is claimed is:

1. A display panel, wherein, the display panel comprises:
an array substrate, comprising a display area and a line arrangement area defined on an outer circumference of the display area;
a frame sealant, defined around the display area and located in the line arrangement area;
data lines, defined on the array substrate;
scan lines, defined crosswise with the data lines and electrically connected to the data lines;
a signal line assembly, defined on the array substrate, and located in the line arrangement area, the signal line assembly comprising a first signal line group and a second signal line group, the first signal line group crossing the frame sealant, and being defined adjacent to one end of a data line, the second signal line group being defined on a side of the frame sealant close to the display area, and adjacent to the other end of the data line away from the first signal line group; and
a repair line group, defined on the array substrate, and located in the line arrangement area, the repair line group being defined on a side of the frame sealant away from the display area, two ends of the repair line group being electrically connected to the first signal line group and the second signal line group respectively;
wherein the repair line group comprises two first repair lines defined at two opposite ends of the array substrate and a plurality of second repair lines defined at a bottom end of the array substrate, the plurality of second repair lines are spaced apart, the first repair lines are electrically connected to the second repair lines, ends of the first repair lines away from the second repair lines are electrically connected to the first signal line group, two adjacent second repair lines are electrically connected via the second signal line group;

wherein the first signal line group comprises a plurality of first signal line units spaced apart, the plurality of first signal line units are in one-to-one correspondence with the data lines, each of the first signal line units comprises two first signal lines and one second signal line, the two first signal lines are electrically connected, two ends of the second signal line are respectively insulated from one of the first signal lines, and two adjacent first signal line units are electrically connected via the first signal lines, and the first signal lines are electrically connected to the first repair lines;

wherein the one end of the data line is electrically connected to the second signal line, and the other end of the data line is electrically connected the second signal line group, in a case that the data line is disconnected;

the second signal line group comprises a plurality of second signal line units spaced apart, the number of the second signal line units is matched with the number of the first signal line units;

the plurality of second signal line units are in one-to-one correspondence with the data lines, each of the second signal line units comprises each of third signal lines, two adjacent second signal line units are electrically connected via a third signal line, each of the third signal lines is electrically connected to the second repair line;

the other end of the data line is electrically connected to the third signal line, in the case that the data line is disconnected.

2. The display panel of claim 1, wherein, a cross-sectional area of the first repair line is larger than a cross-sectional area of the first signal line, and larger than a cross-sectional area of the second signal line, and larger than a cross-sectional area of the third signal line;

and/or, a cross-sectional area of the second repairing line is larger than a cross-sectional area of the first signal line, and larger than a cross-sectional area of the second signal line, and larger than a cross-section area of the third signal line.

3. The display panel of claim 1, wherein, the data line comprises a front end data line portion defined in the line arrangement area, a display area data line portion defined in the display area, and a rear end data line portion defined in the line arrangement area and away from the front end data line portion, the front end data line portion is adjacent to the first signal line group, the rear end data line portion is adjacent to the second signal line group, the display area data line portion is electrically connected to a scan line;

the front end data line portion is electrically connected to the first signal line group, and the rear end data line portion is electrically connected to the second signal line group, in the case that the display area data line is disconnected.

4. The display panel of claim 1, wherein, the display panel further comprises:

a source driver, defined on the array substrate, and located in the line arrangement area, the source driver being defined on a side of the frame sealant away from the display area, the source driver being electrically connected to the first signal line group and the data line;

a gate driving circuit, defined on the array substrate, and located in the line arrangement area, the gate driving circuit being defined on a side of the frame sealant close to the display area, a scan line being electrically connected to the gate driving circuit.

5. The display panel of claim 1, wherein, the display panel further comprises:

a color filter substrate, the color film substrate being defined opposite to the array substrate;

a liquid crystal layer, the liquid crystal layer being defined between the array substrate and the color filter substrate, the frame sealant being defined between the array substrate and the color filter substrate, and defined around a periphery of the liquid crystal layer; and a sealing member, the sealing member being defined on a periphery of the array substrate and the color filter substrate, and defined around the repair line group.

6. The display panel of claim 5, wherein, the display panel further comprises a light shielding member defined on the color filter substrate, the light shielding member covers the line arrangement area.

7. A display panel, wherein, the display panel comprises:

an array substrate, comprising a display area and a line arrangement area defined on an outer circumference of the display area;

a frame sealant, defined around the display area and located in the line arrangement area;

data lines, defined on the array substrate;

scan lines, defined crosswise with the data lines and electrically connected to the data lines;

a signal line assembly, defined on the array substrate, and located in the line arrangement area, the signal line assembly comprising a first signal line group and a second signal line group, the first signal line group crossing the frame sealant, and being defined adjacent to one end of a data line, the second signal line group being defined on a side of the frame sealant close to the display area, and adjacent to the other end of the data line away from the first signal line group; and a repair line group, defined on the array substrate, and located in the line arrangement area, the repair line group being defined on a side of the frame sealant away from the display area, two ends of the repair line group being electrically connected to the first signal line group and the second signal line group respectively;

wherein the repair line group comprises two first repair lines defined at two opposite ends of the array substrate and a plurality of second repair lines defined at a bottom end of the array substrate, the plurality of second repair lines are spaced apart, the first repair lines are electrically connected to the second repair lines, ends of the first repair lines away from the second repair lines are electrically connected to the first signal line group, two adjacent second repair lines are electrically connected via the second signal line group;

wherein the first signal line group comprises a plurality of first signal line units spaced apart, the plurality of first signal line units are in one-to-one correspondence with the data lines, each of the first signal line units comprises two first signal lines and one second signal line, the two first signal lines are electrically connected, two ends of the second signal line are respectively insulated from one of the first signal lines, and two adjacent first signal line units are electrically connected via the first signal lines, and the first signal lines are electrically connected to the first repair lines;

wherein the one end of the data line is electrically connected to the second signal line, and the other end of the data line is electrically connected the second signal line group, in a case that the data line is disconnected;

a source driver, defined on the array substrate, and located in the line arrangement area, the source driver being defined on a side of the frame sealant away from the display area, the source driver being electrically connected to the first signal line group and the data line;

a gate driving circuit, defined on the array substrate, and located in the line arrangement area, the gate driving circuit being defined on a side of the frame sealant close to the display area, a scan line being electrically connected to the gate driving circuit;

a color filter substrate, the color film substrate being defined opposite to the array substrate;

a liquid crystal layer, the liquid crystal layer being defined between the array substrate and the color filter substrate, the frame sealant being defined between the array substrate and the color filter substrate, and defined around a periphery of the liquid crystal layer; and a sealing member, the sealing member being defined on a periphery of the array substrate and the color filter substrate, and defined around the repair line group;

wherein the second signal line group comprises a plurality of second signal line units spaced apart, the number of the second signal line units is matched with the number of the first signal line units; the plurality of second signal line units are in one-to-one correspondence with the data lines, each of the second signal line units comprises each of third signal lines, two adjacent second signal line units are electrically connected via a third signal line, each of the third signal lines is electrically connected to the second repair line;

the other end of the data line is electrically connected to the third signal line, in the case that the data line is disconnected.

8. A repair method for a display panel, wherein, the repair method comprises a display panel, the display panel comprises:

an array substrate, comprising a display area and a line arrangement area defined on an outer circumference of the display area;

a frame sealant, defined around the display area and located in the line arrangement area;

data lines, defined on the array substrate;

scan lines, defined crosswise with the data lines and electrically connected to the data lines;

a signal line assembly, defined on the array substrate, and located in the line arrangement area, the signal line assembly comprising a first signal line group and a second signal line group, the first signal line group crossing the frame sealant, and being defined adjacent to one end of a data line, the second signal line group being defined on a side of the frame sealant close to the display area, and adjacent to the other end of the data line away from the first signal line group; and a repair line group, defined on the array substrate, and located in the line arrangement area, the repair line group being defined on a side of the frame sealant away from the display area, two ends of the repair line group being electrically connected to the first signal line group and the second signal line group respectively;

wherein the repair line group comprises two first repair lines defined at two opposite ends of the array substrate and a plurality of second repair lines defined at a bottom end of the array substrate, the plurality of second repair lines are spaced apart, the first repair lines are electrically connected to the second repair lines, ends of the first repair lines away from the second repair lines are electrically connected to the first signal line group, two adjacent second repair lines are electrically connected via the second signal line group;

wherein the first signal line group comprises a plurality of first signal line units spaced apart, the plurality of first signal line units are in one-to-one correspondence with the data lines, each of the first signal line units comprises two first signal lines and one second signal line, the two first signal lines are electrically connected, two ends of the second signal line are respectively insulated from one of the first signal lines, and two adjacent first signal line units are electrically connected via the first signal lines, and the first signal lines are electrically connected to the first repair lines;

in a case that the data line located in the display area is disconnected, the repair method comprises the following operations:

allowing the one end of the disconnected data line to be electrically connected to the second signal line, and the other end of the disconnected data line to be electrically connected to the second signal line group, to realize the data line located in the display area being electrically connected to a scan;

wherein the second signal line group comprises a plurality of second signal line units spaced apart, the number of the second signal line units is matched with the number of the first signal line units; the plurality of second signal line units are in one-to-one correspondence with the data lines, each of the second signal line units comprises each of third signal lines, two adjacent second signal line units are electrically connected via a third signal line, each of the third signal lines is electrically connected to the second repair line;

the other end of the data line is electrically connected to the third signal line, in the case that the data line is disconnected.

9. The repair method of claim 8, wherein, a cross-sectional area of the first repair line is larger than a cross-sectional area of the first signal line, and larger than a cross-sectional area of the second signal line, and larger than a cross-sectional area of the third signal line;

and/or, a cross-sectional area of the second repairing line is larger than a cross-sectional area of the first signal line, and larger than a cross-sectional area of the second signal line, and larger than a cross-section area of the third signal line.

10. The repair method of claim 8, wherein, the data line comprises a front end data line portion defined in the line arrangement area, a display area data line portion defined in the display area, and a rear end data line portion defined in the line arrangement area and away from the front end data line portion, the front end data line portion is adjacent to the first signal line group, the rear end data line portion is adjacent to the second signal line group, the display area data line portion is electrically connected to the scan line;

the front end data line portion is electrically connected to the first signal line group, and the rear end data line portion is electrically connected to the second signal line group, in the case that the display area data line is disconnected.

11. The repair method of claim 8, wherein, the display panel further comprises:

a source driver, defined on the array substrate, and located in the line arrangement area, the source driver being defined on a side of the frame sealant away from the display area, the source driver being electrically connected to the first signal line group and the data line;

a gate driving circuit, defined on the array substrate, and located in the line arrangement area, the gate driving circuit being defined on a side of the frame sealant close to the display area, the scan line being electrically connected to the gate driving circuit.

12. The repair method of claim 8, wherein, the display panel further comprises:
   a color filter substrate, the color film substrate being defined opposite to the array substrate;
   a liquid crystal layer, the liquid crystal layer being defined between the array substrate and the color filter substrate, the frame sealant being defined between the array substrate and the color filter substrate, and defined around a periphery of the liquid crystal layer; and
   a sealing member, the sealing member being defined on a periphery of the array substrate and the color filter substrate, and defined around the repair line group.

13. The repair method of claim 12, wherein, the display panel further comprises a light shielding member defined on the color filter substrate, the light shielding member covers the line arrangement area.

\* \* \* \* \*